(12) United States Patent
Hill et al.

(10) Patent No.: US 11,549,422 B1
(45) Date of Patent: Jan. 10, 2023

(54) EXHAUST SYSTEM FOR A COMBUSTION ENGINE INCLUDING A FLOW DISTRIBUTOR

(71) Applicant: TENNECO AUTOMOTIVE OPERATING COMPANY INC., Lake Forest, IL (US)

(72) Inventors: Edward C. Hill, Jackson, MI (US); Matthew Yule, Howell, MI (US); Christopher Poplin, Westland, MI (US); Brooke E. Gwaltney, Jackson, MI (US); Xuegeng Zhu, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 17/543,535

(22) Filed: Dec. 6, 2021

(51) Int. Cl.
*F01N 3/28* (2006.01)

(52) U.S. Cl.
CPC .................................. *F01N 3/2892* (2013.01)

(58) Field of Classification Search
CPC ........ F01N 3/2892; F01N 3/05; F01N 3/2066; F01N 2240/20
USPC .......................................................... 60/324
See application file for complete search history.

(56) References Cited

U.S. PATENT DOCUMENTS

| | | | |
|---|---|---|---|
| 4,065,918 A | 1/1978 | Rifkin | |
| 5,058,703 A | 10/1991 | Ealba et al. | |
| 5,792,432 A | 8/1998 | Kato et al. | |
| 6,074,619 A | 6/2000 | Schoubye | |
| 6,609,590 B2 | 8/2003 | Zelinski | |
| 6,953,555 B2 | 10/2005 | Endo | |
| 8,033,104 B2 | 10/2011 | Zhang | |
| 8,141,353 B2 * | 3/2012 | Zheng | B01F 25/3131 60/770 |
| 8,393,146 B2 | 3/2013 | Kowada et al. | |
| 8,443,933 B2 | 5/2013 | Pfeffer et al. | |
| 8,939,638 B2 | 1/2015 | Palmer et al. | |
| 9,194,267 B2 * | 11/2015 | Loman | B01F 25/102 |
| 9,267,417 B2 * | 2/2016 | Baldwin | F01N 13/08 |
| 9,605,577 B2 | 3/2017 | Navathe et al. | |
| 9,726,063 B2 | 8/2017 | Sampath et al. | |
| 9,938,878 B2 | 4/2018 | Ferront et al. | |
| 10,030,565 B2 * | 7/2018 | Sato | F01N 3/2892 |
| 10,100,700 B2 | 10/2018 | Zhang et al. | |
| 10,132,222 B2 | 11/2018 | Balea et al. | |
| 10,179,315 B2 * | 1/2019 | Brandl | F01N 3/021 |
| 10,196,957 B2 | 2/2019 | Petry | |
| 10,605,143 B2 | 3/2020 | Zhang et al. | |
| 10,711,677 B2 | 7/2020 | Noren, IV et al. | |
| 2011/0239631 A1 | 10/2011 | Bui et al. | |
| 2012/0144812 A1 | 6/2012 | Hyun | |

(Continued)

FOREIGN PATENT DOCUMENTS

| | | |
|---|---|---|
| CN | 202181942 U | 4/2012 |
| CN | 107939490 A | 4/2018 |

(Continued)

*Primary Examiner* — Devon C Kramer
*Assistant Examiner* — Kelsey L Stanek
(74) *Attorney, Agent, or Firm* — McGarry Bair PC

(57) ABSTRACT

A flow distributor provided within an exhaust system for a combustion engine configured to generate an exhaust fluid stream. The flow distributor comprising an inlet, and a plate. The plate having at least one perforation defining an outlet, a first peak and a second peak spaced from the first peak.

20 Claims, 8 Drawing Sheets

(56) References Cited

U.S. PATENT DOCUMENTS

| | | |
|---|---|---|
| 2012/0151902 A1 | 6/2012 | Yl et al. |
| 2013/0269325 A1 | 10/2013 | Hadden et al. |
| 2013/0291524 A1 | 11/2013 | Shin |
| 2017/0152782 A1 | 6/2017 | Petry |

FOREIGN PATENT DOCUMENTS

| | | |
|---|---|---|
| CN | 112459878 A | 3/2021 |
| CN | 113153498 A | 7/2021 |
| DE | 102008031136 A1 | 1/2010 |
| EP | 0318413 B1 | 7/1992 |
| FR | 2906300 A1 | 3/2008 |
| FR | 2957119 A1 | 9/2011 |
| JP | 2005163621 A | 6/2005 |
| WO | 2015197145 A1 | 12/2015 |
| WO | 2016109321 A1 | 7/2016 |
| WO | 2021023418 A1 | 2/2021 |

\* cited by examiner

EXHAUST SYSTEM FOR A COMBUSTION ENGINE INCLUDING A FLOW DISTRIBUTOR

TECHNICAL FIELD

The disclosure generally relates to a flow distributor, and more specifically to a flow distributor provided within an exhaust system of a combustion engine.

BACKGROUND

In an attempt to reduce the quantity of NOx and particulate matter emitted to the atmosphere during internal combustion engine operation, a number of exhaust aftertreatment devices have been developed. Typical aftertreatment systems for diesel engine exhaust may include a diesel oxidation catalyst (DOC), a diesel particulate filter (DPF), and a selective catalytic reduction (SCR) catalyst, a reductant injector and/or a hydrocarbon injector. A mixer or flow distributor is typically provided for mixing the injected reductant or hydrocarbon with the exhaust gas upstream of a catalyst or filter. Flow distributors may also spread the flow of an exhaust airstream over more surface area of the catalyst or filter to maximize the effectiveness of the catalyst or filter. Without such exhaust flow distributors, a percentage of catalyst or filter surface area may be unused or underutilized.

Flow distributors can include a front face with a plurality of perforations. The front face can be formed as a planar or dome-shaped front face. These configurations, however, do not provide an exhaust air flow that covers the entire catalyst or filer and they are susceptible to failure or warping from high or prolonged thermal loads.

BRIEF DESCRIPTION

In one aspect, the disclosure relates to a flow distributor provided within an exhaust system for a combustion engine configured to generate an exhaust fluid stream, the flow distributor comprising an inlet configured to receive at least a portion of the exhaust fluid stream, and a plate provided downstream of the inlet, the plate comprising a first perforation including a first cross-sectional area when viewed along a plane intersecting and extending along the first perforation, a second perforation including a second cross-sectional area, smaller than the first cross-sectional area, when viewed in a plane intersecting and extending along the second perforation, a first peak, a second peak spaced from the first peak, and a first valley formed between the first peak and the second peak, wherein the first perforation and the second perforation together form an outlet for the exhaust fluid stream In another aspect, the disclosure relates to an exhaust system including a flow distributor provided within an exhaust system for a combustion engine configured to generate an exhaust fluid stream, the flow distributor comprising an inlet configured to receive at least a portion of the exhaust fluid stream, and a plate provided downstream of the inlet, the plate comprising at least one perforation defining an outlet for the exhaust fluid stream, a first peak, a second peak spaced from the first peak, a first valley formed between the first peak and the second peak, and a second valley provided formed on an opposite side of the second peak with respect to the first valley.

In another aspect, the disclosure relates to an exhaust system including a flow distributor provided within an exhaust system for a combustion engine configured to generate an exhaust fluid stream, the flow distributor comprising an inlet configured to receive at least a portion of the exhaust fluid stream, and a plate provided downstream of the inlet, the plate comprising at least one perforation defining an outlet for the exhaust fluid stream, a first peak defined by a first radius of curvature, a second peak spaced from the first peak and defined by a second radius of curvature, a first valley formed between the first peak and the second peak and defined by a third radius of curvature, and at least one linear region extending between the first peak and the first valley, wherein the at least one perforation terminates at one of either a distance greater than or equal to one two the first radius of curvature from a point on the linear region nearest the first peak, or at a distance greater than or equal to one-fourth times the third radius of curvature from a point on the linear region nearest the first valley.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
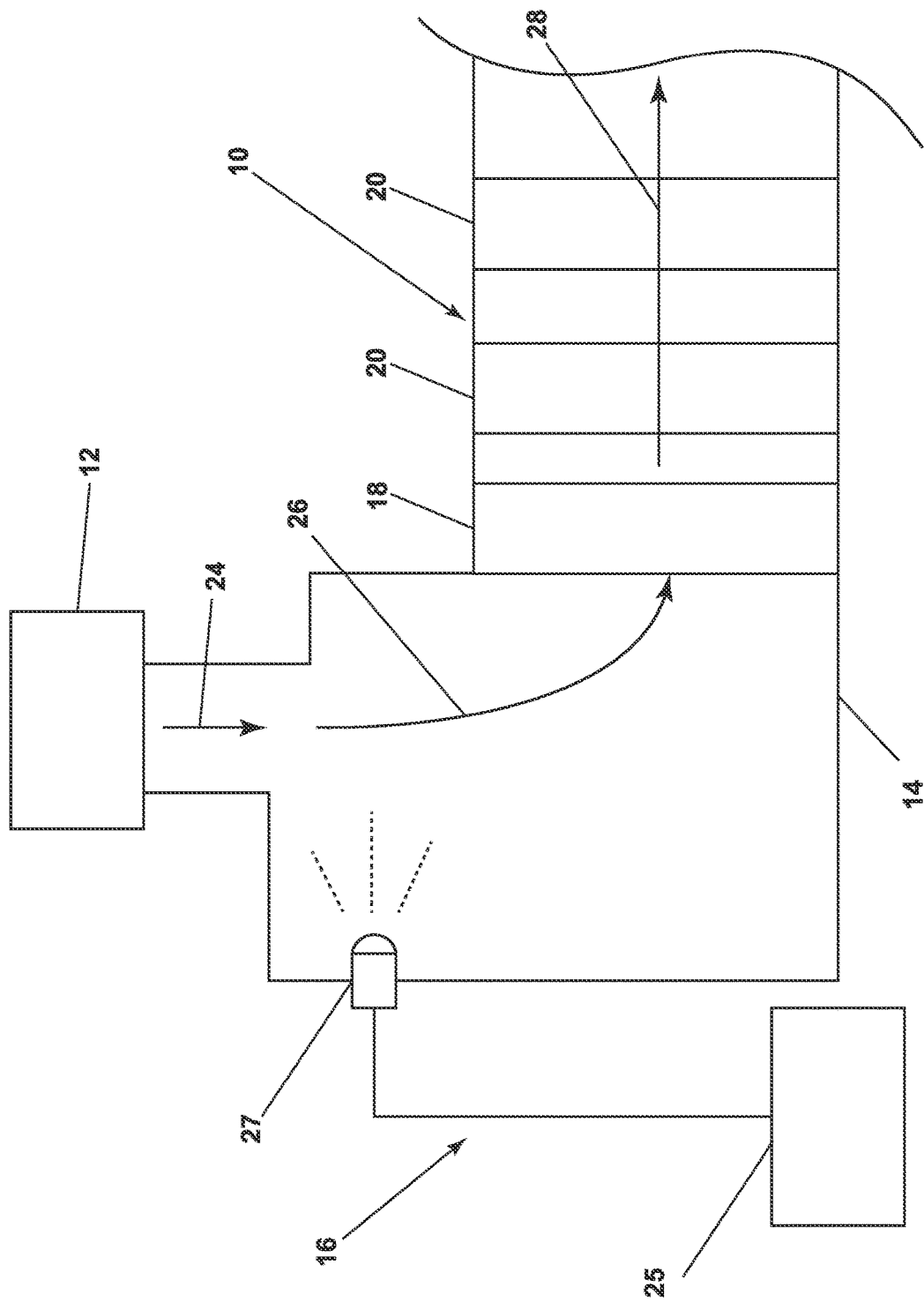
FIG. 1 is a schematic representation of a generic combustion engine and a generic exhaust system including a flow distributor, according to aspects described herein.

Aspects of this disclosure described herein are broadly directed to a flow distributor provided within an exhaust system of a combustion engine configured to generate an exhaust fluid stream. As used herein the term "exhaust fluid stream" can refer to any suitable by-product generated through the operation of the combustion engine. As a non-limiting example, the exhaust fluid stream can include a particulate matter. The exhaust system can be configured to remove the particulate matter from the exhaust fluid stream through use of a catalyst or filter. The exhaust fluid stream can further be defined as a mixture of exhaust or by-product directly from the combustion engine and an injected fluid (e.g., a hydrocarbon or reductant). The exhaust fluid stream can include a combination of gasses, liquids, or particulate matter. The flow distributor can be configured to distribute the exhaust fluid stream over at least a portion of the catalyst or filter downstream of the flow distributor. The flow distributor can include an inlet configured to receive the exhaust fluid stream, and a plate defining an outlet for the exhaust fluid stream. As a non-limiting example, the plate can include at least one perforation defining the outlet. The plate can further include a first peak extending form the plate and defining a centerline axis, and at least one peak spaced from the first peak. A valley can be formed between the first peak and the at least one peak.

The flow distributor can be utilized within any suitable combustion engine or exhaust system. As a non-limiting example, the flow distributor can be utilized within a diesel combustion engine for a vehicle and be provided within a diesel exhaust system upstream of a catalytic converter. It will be understood, however, that aspects of are not so limited and can have general applicability within other assemblies including a flow distributor. For example, the disclosure can have applicability for a flow distributor provided within an exhaust system in other applications or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. Furthermore, as used herein, the term "set" or a "set of elements" can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic representation of a combustion engine 12 operably coupled to an exhaust system 10 including a flow distributor 18. The exhaust system 10 can be configured to treat an exhaust fluid stream output by a combustion engine 12 during operation of the combustion engine 12. The exhaust system 10 can include a fluid delivery system 16, the flow distributor 18, and any other suitable device within the exhaust system 10. As a non-limiting example, the exhaust system can include one or more aftertreatment devices 20 provided downstream from the flow distributor 18. It is contemplated that at least a portion of the exhaust system 10 can be received within a singular housing or a plurality of fluidly coupled housings. It will be appreciated that the flow distributor 18 can be provided within any suitable exhaust system and is not limited to the exhaust system 10.

The aftertreatment devices 20 may include a diesel oxidation catalyst (DOC), a diesel particulate filter (DPF), a selective-catalytic-reduction (SCR) catalyst, and/or any other exhaust aftertreatment component. As a non-limiting example, the DOC may be utilized to oxidize hydrocarbons and carbon monoxide of the exhaust gas and oxidize nitrogen monoxide to nitrogen dioxide. The DPF may include a catalyst support for trapping particulate matter (PM) entrained in the exhaust gas, and the catalyst support eliminates the PM through a chemical reaction. The SCR catalyst may convert nitrogen oxides in the exhaust gas to nitrogen (N2), water and/or carbon dioxide, for example.

The fluid delivery system 16 can pump a fluid (e.g., a hydrocarbon fuel or reductant such as urea or ammonia) from a tank 25 to an injector 27 that may spray the fluid into the exhaust stream within the housing 14 at or upstream of the flow distributor 18. The flow distributor 18 can mix the fluid with the exhaust gas to provide a more uniform mixture of the fluid and exhaust gas before the mixture enters the aftertreatment device 20.

The exhaust system 10 can further include a first exhaust fluid stream 24, a second exhaust fluid stream 26, and a third exhaust fluid stream 28. The first exhaust fluid stream 24, the second exhaust fluid stream 26, and the third exhaust fluid stream 28 can be generated during operation of the combustion engine 12 and the exhaust system 10.

Figure 2:
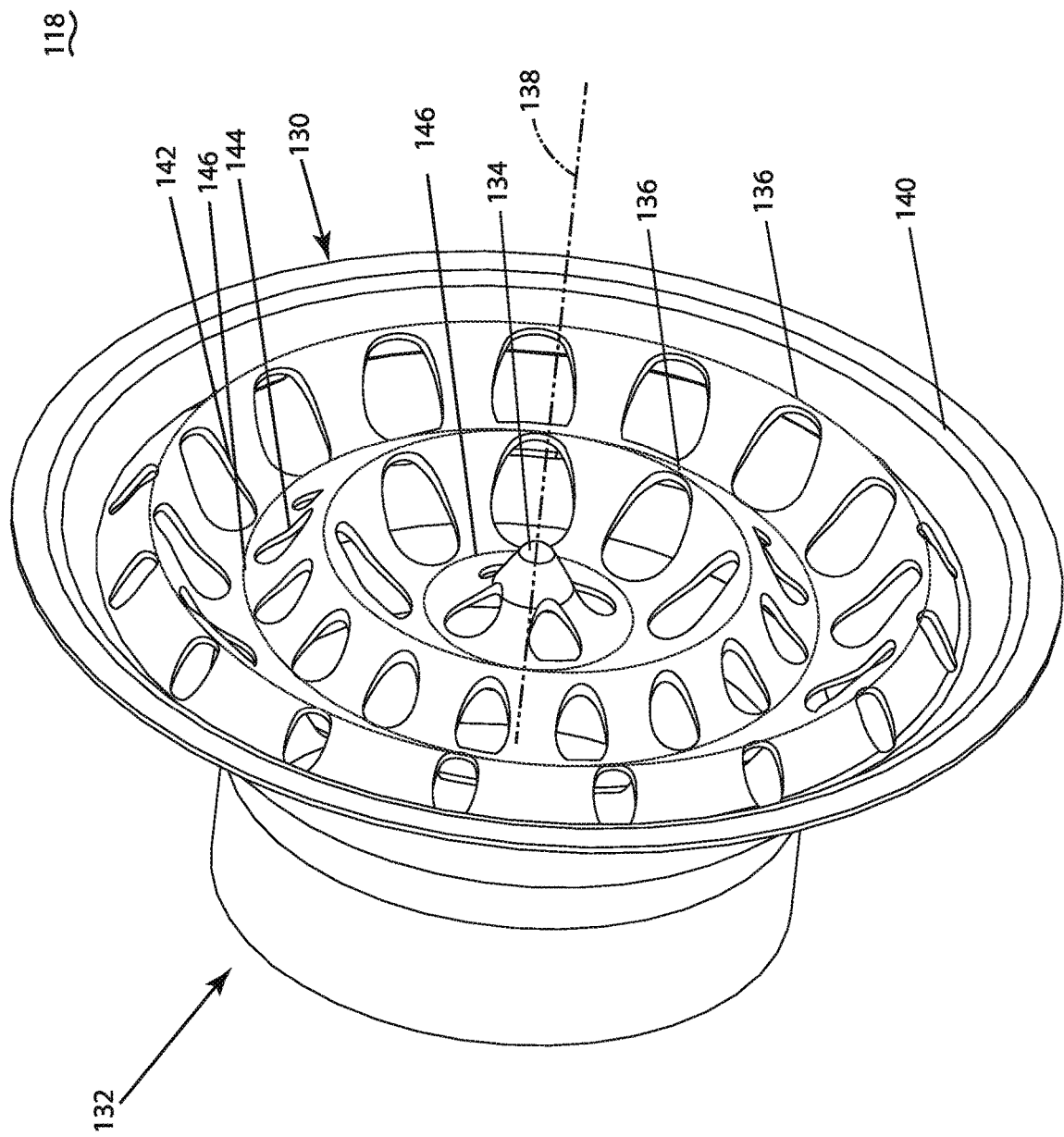
FIG. 2 is a perspective view of a flow distributor suitable for use as the flow distributor of FIG. 1, further illustrating a plate of the flow distributor including a plurality of peaks, a set of valleys, and a set of perforations.

FIG. 2 is a perspective view of a flow distributor 118 suitable for use as the flow distributor 18 of FIG. 1 removed from a remainder of the exhaust system 10. The flow distributor 18 can include an inlet 132 and a plate 130. The inlet 132 and the plate 130 can be integrally formed with one another or otherwise operably coupled to each other. As a non-limiting example, the plate 130 can be operably coupled to the inlet 132 through any suitable method such as, but not limited to, welding, fastening, adhesion, magnetism, friction, or any combination thereof.

As illustrated the plate 130 is formed as a circumferential plate. The plate 130 can include a lip 140 defining an outer circumference or periphery of the plate 130. It will be appreciated, however, that the plate 130 can be formed as any suitable plate 130 such as, but not limited to, an elliptical or polygonal plate.

The plate 130 can include a plurality of protrusions or peaks extending from the plate 130. As a non-limiting example, the plurality of peaks can include a first peak 134 provided within the center of the plate 130 such that it forms a central peak and a set of peaks 136. The plurality of peaks can include any number of two or more peaks. The first peak 134 can define a centerline axis 138 of the plate 130 extending normal to the plate 130. In other words, the first peak 134 can define a center point of the plate. It will be appreciated, however, that the first peak 134 can be offset with respect to the center point of the plate 130.

The set of peaks 136 can extend circumferentially about the entire first peak 134. As such, the set of peaks 136 can be defined as a circumferential peak that is radially spaced from the first peak 134 and circumscribes the first peak 134. It will be further appreciated that the first peak 134 can be concentric to the set of peaks 136. Alternatively, the set of peaks 136 can be non-concentric to the first peak 134.

A set of valleys 146 can be formed between the set of peaks 136 and the first peak 134. The set of valleys 146 can be defined as a portion of the plate 130, which interconnects adjacent peaks 136 (e.g., the first peak 134 and the adjacent set of peaks 136). As illustrated, the plate 130 can include two peaks 136 radially spaced from the first peak 134 with respect to the centerline axis 138. As a non-limiting example, the set of valleys 146 can include three valleys 146 with one valley 146 of the three valleys 146 being provided between the first peak 134 and an adjacent peak 136, the second valley 146 of the three valleys 146 being provided between the two adjacent peaks 136, and the third valley 146 of the three valleys 146 being formed between the last, most radially outward peak 136 and the lip 140. It will be appreciated, however, that there can be any number of one or more peaks 136 of the set of peaks 136 and any number of one or more corresponding valleys 146. With the peak and valley formation of the plate 130, the plate 130 can be formed as a wave formation. The wave formation can be, as a non-limiting example, a sinusoidal wave, a non-sinusoidal wave, or a ripple wave (e.g., the peaks decrease in amplitude from the first peak 134 toward the lip 140) formation.

The plate 130 can include at least one perforation to define an outlet of the flow distributor 118. As a non-limiting example, the plate 130 can include a first set of perforations 142 and a second set of perforations 144. The first set of perforations 142 can include a plurality of first perforations circumferentially spaced with respect to one another. The second set of perforations 144 can include a plurality of second perforations circumferentially spaced with respect to one another. The first set of perforations 142 and the second set of perforations 144 can be radially spaced with respect to one another and with respect to the centerline axis 138 of the first peak 134.

Figure 3:
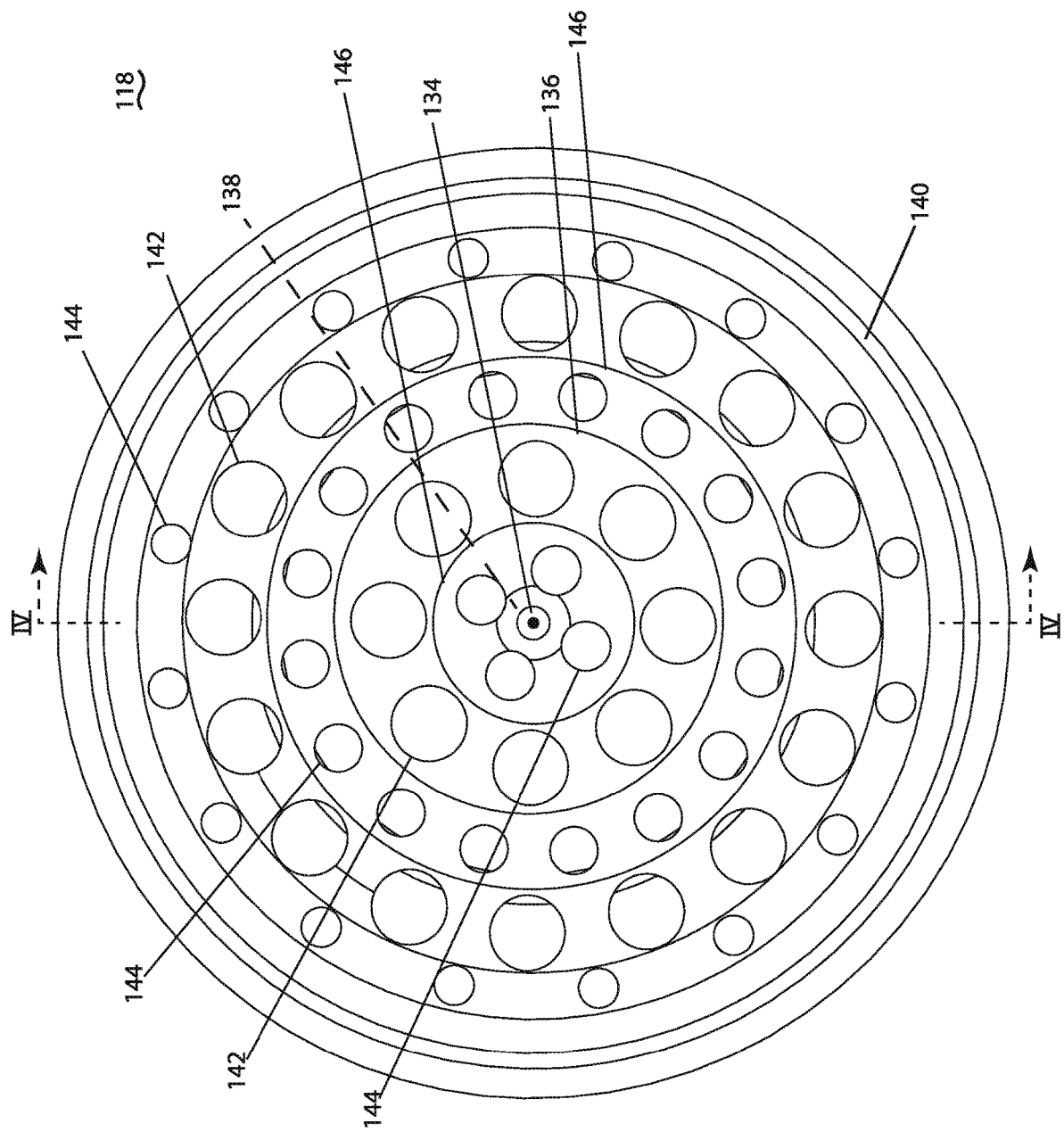
FIG. 3 is a front view of the flow distributor of FIG. 2.

FIG. 3 is a front view of the flow distributor 118 of FIG. 2. As illustrated, the plate 130 of the flow distributor 118 can include the first set of perforations 142 and the second set of perforations 144. The first set of perforations 142 can include two rows of perforations circumferentially spaced with respect to one another. The second set of perforations 144 can include three rows of perforations circumferentially spaced with respect to one another and alternately circumstantially spaced with respect to the first set of perforations 142. It will be appreciated, however, that there can be any number of one or more rows of the first set of perforations 142 or the second set of perforations 144.

Each perforations of the first set of perforations 142 can be defined by a first cross-sectional area when viewed in a plane intersecting and parallel to the first perforation 142. Each perforations of the second set of perforations 144 can be defined by a second cross-sectional area when viewed in a plane intersecting and parallel to the second perforation 144. The first cross-sectional area can be larger than the second cross-sectional area. Alternatively, the first cross-sectional area can be smaller or equal to the second cross-sectional area. While the at least one perforation is illustrated as a circular perforation, it will be appreciated that he perforation can take any shape, size, or form. As a non-limiting example, at least a portion, or circumferential row, of the perforations can be elliptical, polygonal, circular, or slits. As a non-limiting example, a circumferentially outer set of perforations with respect to the centerline axis 138 can be elliptical in form, while the remaining perforations are circular.

It will be appreciated that the first set of perforations 142 and the second set of perforations 144 can be provided along any portion of the plate 130. It is contemplated that that at least one of the first set of perforations 142 or the second set of perforations 144 are not provided along or intersect the first peak 134 or the set of peaks 136. In other words, the first set of perforations 142 or the second set of perforations 144 can be formed only in the set of valleys 146.

Figure 4:
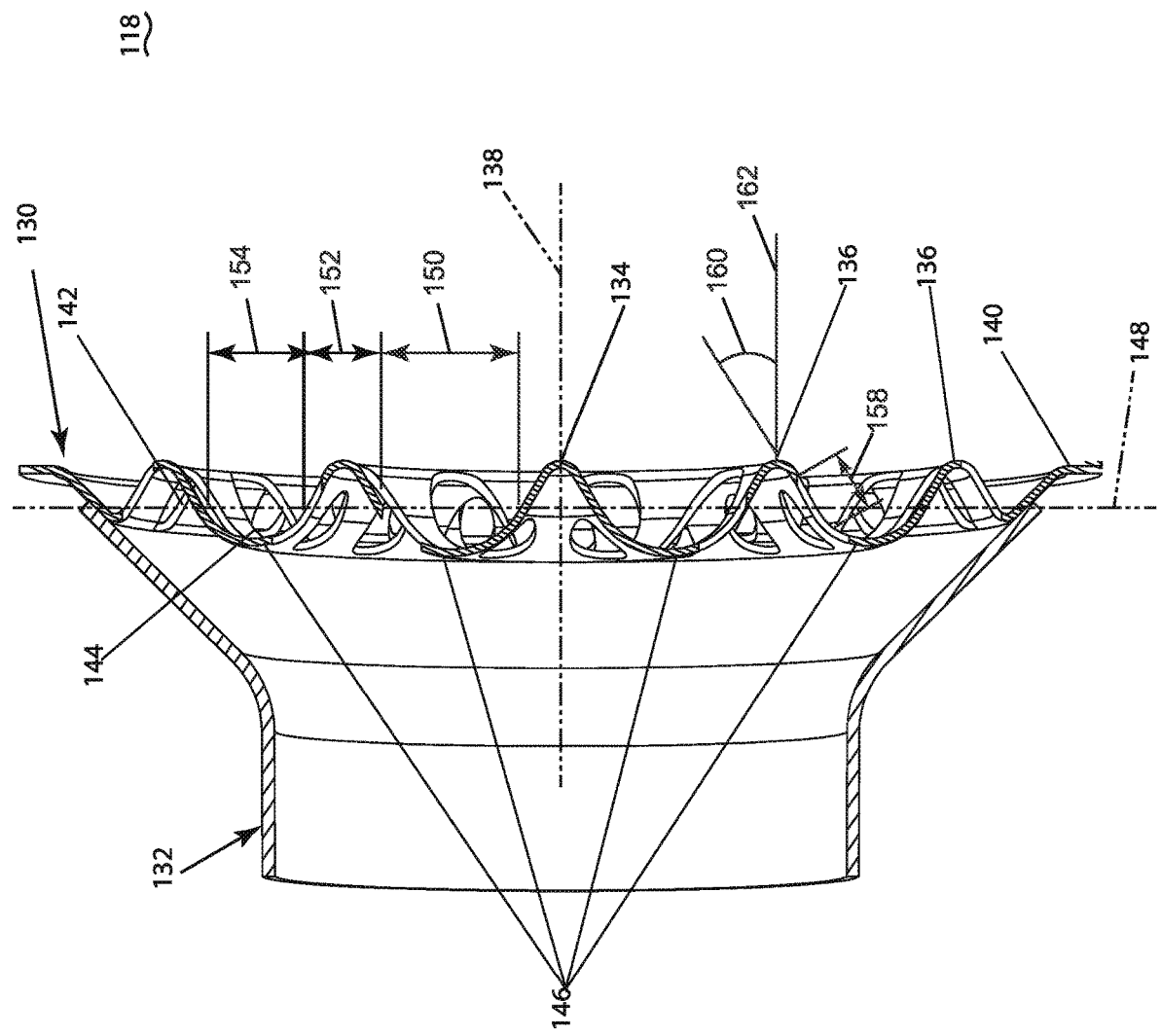
FIG. 4 is a cross-sectional side view of the flow distributor as seen from section IV-IV of FIG. 3, further illustrating a wave formation of the plate.

FIG. 4 is a cross-sectional side view of the flow distributor 118 as seen from section IV-IV of FIG. 3.

As illustrated, the flow distributor 118 can include a wave formation defined by the plurality of peaks and the set of valleys 146. As a non-limiting example, the wave formation can start from the first peak 134 and extending circumferentially outward toward the lip 140. Each valley of the set of valleys 146 can include a minimum defined by the maximum distance the respective valley 146 extends with respect to a plane normal to the centerline axis 138 and intersecting a midpoint between a minimum of the valleys 146 and the first peak 134 illustrated by line 148. Each peak 136 of the set of peaks 136 can define an apex or localized maximum or peak with respect to the plane normal to the centerline axis 138 and intersecting a midpoint between a minimum of the valleys 146 and the first peak 134 illustrated by line 148. As a non-limiting example, the amplitude of each peak of the set of peaks 136 can be equal to one another. As a non-limiting example, the amplitude of each minimum for each valley of the set of valleys 146 can be equal to one another. As a non-limiting example, the amplitude of each peak of the set of peaks 136, the amplitude of the first peak 134, and the amplitude of each minimum of the set of valleys 146 can be equal. Alternatively, one or more of the amplitudes of the peaks of the set of peaks 136, the first peak 134, or the minimum of the set of valleys 146 can be non-equal. As a non-limiting example, the minimum of each valley of the set of valleys 146 and the apex of each peak of the set of peaks can be provided on axially opposite ends of the midpoint illustrated by the line 148, with respect to the centerline axis 138. In other words, each valley of the set of valleys 146 can extend axially inwardly, with respect to the centerline axis 138, from the midpoint, while each peak of the set of peaks can extend axially outwardly, with respect to the centerline axis 138, from the midpoint.

Each peak of the plurality of peaks and each valley of the set of valleys 146 can be defined by a radial distance with respect to the centerline axis 138. As illustrated, a first valley of the set of valleys 146 can be defined by a first radial distance 150, a first peak of the set of peaks 136 (e.g., the peak nearest the first peak 134) can be defined by a second radial distance 152, while a second valley of the set of valleys 146 provided radially outward from the first valley can be define by a third radial distance 154. The first radial distance 150 can be equal to the third radial distance 154. The second radial distance 152, however, can be non-equal to the first radial distance 150 or the third radial distance 150. In other words, the radial span of the peaks can be smaller than the radial span of the valleys. Alternatively, the first radial distance 150 can be non-equal to the third radial distance 154, or the second radial distance 152 can be larger than the first radial distance 150 or the second third radial distance 154.

The transition between the plurality of peaks and the set of valleys 146 can be defined by a linear region 158. As a non-limiting example, the linear region 158 can define a portion of the plate 130 which extend linearly or without a curve with respect to the centerline axis 138 and the midline 148. It will be appreciated that each transition between a peak and a valley can be defined by the linear region 158. The linear region 158 can be defined by an angle 160 with respect to a projection 162 of the centerline axis 138. The length of the linear region 158 can be at least partially dependent on the thickness of the plate 130. As a non-limiting example, the length of the linear region 158 can be greater 0-times the thickness of the plate and less than or equal to 10-times the thickness of the plate 130. As a non-limiting example, the length of the linear region 158 can be greater than or equal to 4times the thickness of the plate 130. As a non-limiting example, the absolute value of the angle 160 of which the linear region 158 extends at can be between 0 degrees and 45 degrees. As a non-limiting example, the absolute value of the angle 160 of which the linear region 158 extends at can be 30 degrees.

As the linear region 158 transitions into a respective valley or peak, a radius of curvature can be formed to define the corresponding peak or valley. As the peaks, as discussed herein, can have a smaller radial distance than the radial distance of the valleys, it follows that the radius of curvature for the peaks can be smaller (e.g., tighter) than the radius of curvature for the valleys. It will be appreciated that at least a portion of the perforations can be formed on the linear region 158 or at least a portion of the peaks or valleys defined by the radius of curvature. As a non-limiting example, the perforations can axially terminate, with respect to the centerline axis 138, within 2 times the radius of curvature of the peak from where the linear region 158 meets or axially terminates at a respective peak. As a non-limiting example, the perforations can axially terminate, with respect to the centerline axis 138, within 1 times the radius of curvature of the peak from where the linear region 158 meets or axially terminates at a respective peak. As a non-limiting example, the perforations can axially terminate, with respect to the centerline axis 138, within 0.5 times the radius of curvature of the valley from where the linear region 158 meets or axially terminates at a respective valley. A non-limiting example, the perforations can axially terminate, with respect to the centerline axis 138, within 0.25 times the radius of curvature of the valley from where the linear region 158 meets or axially terminates at a respective valley.

Figure 5:
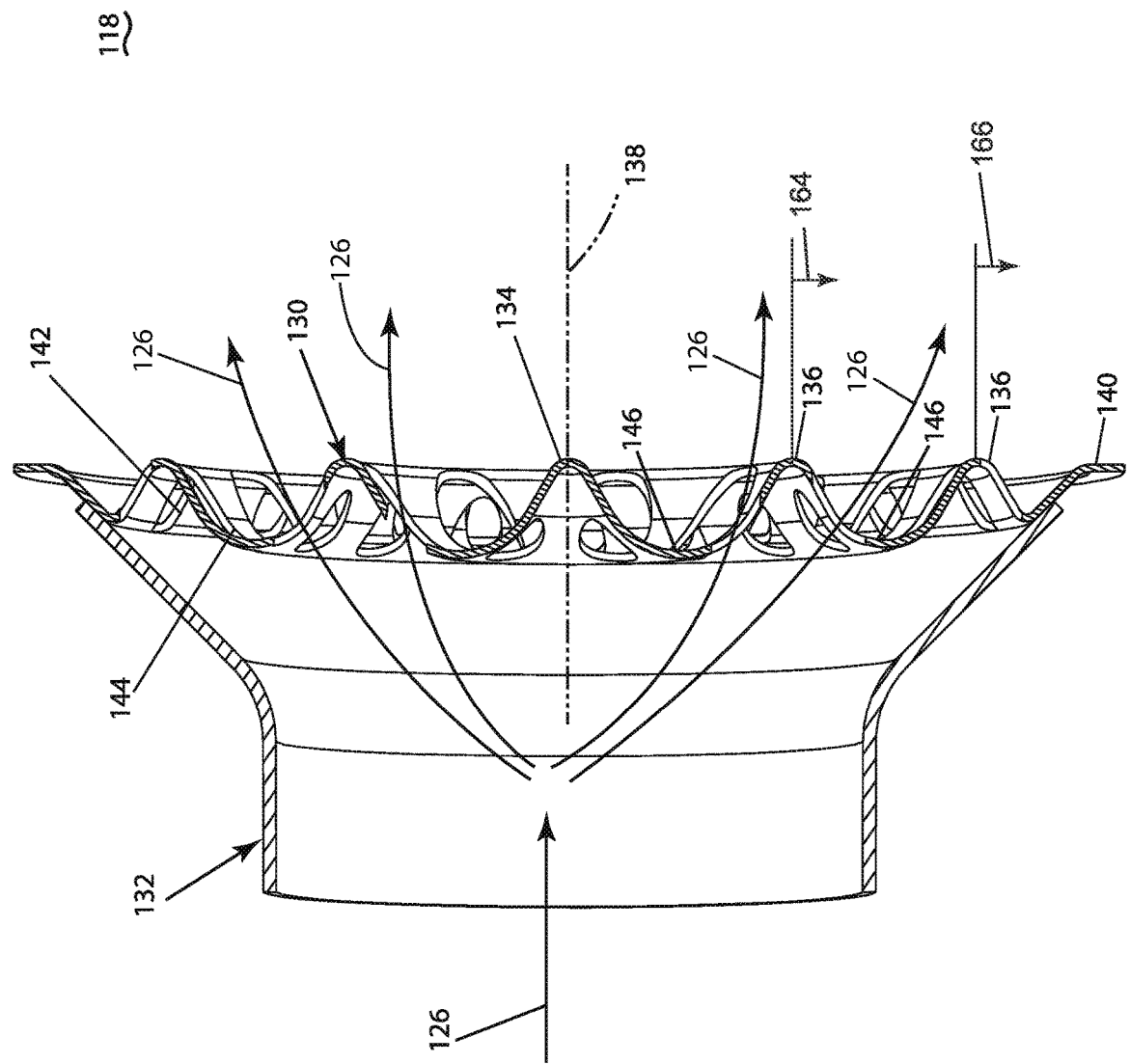
FIG. 5 is a cross-sectional side view of the flow distributor as seen from section IV-IV of FIG. 3, further illustrating an operation of the flow distributor.

FIG. 5 is a cross-sectional side view of the flow distributor 118 as seen from section IV-IV of FIG. 3, further illustrating an operation of the flow distributor 118.

During operation of a combustion engine (e.g., the combustion engine 12) that the flow distributor 118 is operably coupled to, an exhaust fluid stream 126 (e.g., the first exhaust fluid stream 24 or the second exhaust fluid stream 26) can through the flow distributor 118. The exhaust fluid stream 126, as it flows in through the inlet 132, can fan-out or otherwise disperse within the flow distributor 118 and ultimately out of the flow distributor 118. The dispersion of the second exhaust fluid stream 126 within the flow distributor 118 can be attributed to the formation of the plate 130. It is contemplated that the wave or undulating formation of the plate, and the placement of the first set of perforations 142 and the second set of perforations 144 can result in the exhaust fluid stream 126 to be dispersed and evenly distributed throughout the first set of perforations 142 and the second set of perforations 144. In other words, the flow distributor 118 can be used to distribute the exhaust fluid stream 126 in a preferred profile (e.g., shape, volume, distribution, etc.). It is contemplated that the plate 130 can be sized to correspond to a surface area of a device downstream of the flow distributor 118 (e.g., the aftertreatment device 20). As such, the flow distributor 118 can disperse the exhaust fluid stream 126 to evenly cover an area corresponding to or near to the surface area of the device downstream of the flow distributor 118.

The second exhaust fluid stream 126 can include at least a portion of the heat generated by the operation of the combustion engine 12. As such, the second exhaust fluid stream 126 can be defined as a heated exhaust fluid stream. As the second exhaust fluid stream 126 flow through, around, or against the plate 130, the heat from the second exhaust fluid stream 126 can be at least partially transferred to the plate 130. This, in turn, causes the plate 130 to radially expand as it is heated up. The plate 130 can then contract back towards its original position as it cools down, thus creating an accordion-like movement of the plate 130 between operational and non-operational states. It is contemplated that the heating of the plate 130 can be uneven such that the plate 130 experiences thermal stresses that form a thermal gradient extending from a center of the plate 130. As such, the plate 130 can be cooler as the farther radially outward you get from the center of the plate 130. The thermal stresses, in turn, results in radially inner portions of the plate 130 expanding more than the radially outer portions of the plate 130. As a non-limiting example, a first peak of the set of peaks 136 can expand a first distance designated by arrow 164, while a second peak of the set of peaks 136 that is radially outward from the first peak can expand a second distance designated by arrow 166. The first distance can be larger than the second distance. As the peaks move, the angle 160 of the linear region 158 can increase or decrease. It will be further appreciated that the plate 130 can move axially outwardly when the thermal load is applied to the plate, with respect to the inlet 132. The axial and radial movement can, in turn, move corresponding portions of the plate 130. The movement of the linear region 158 can further cause at least a portion of the linear region 158 to bend or flex (e.g., become non-linear). The change in the angle and the bending of the linear region 158 can, in turn, cause the linear regions 158 to flex in angle and distribute opposing mechanical stresses along the respective valley and peak that the linear region 158 extends between. The mechanical stresses generated by each linear region 158 due to the radial or axial movement of the plate 130 when under a thermal load can be distributed along the plate 130. The distribution of the mechanical stresses caused by thermal growth of the plate can ultimately create a spring force on the plate 130. The spring force retain the plate 130 within the inlet 132 and ultimately counteract or otherwise oppose the thermal stresses generated through operation.

It is further contemplated that the length and angle 160 of the linear region 158 can be varied dependent on the thermal stress that the linear region 158 will experience during operation. As a non-limiting example, the angle 160 can be larger the farther radially outward from the centerline axis 138 it is. It is contemplated that the plate 130 can include a plurality of linear regions 158 radially spaced with respect to one another. The length and angle of each linear region 158 of the plurality of linear regions 158 can be sized to accommodate for the expected thermal stress that will be experienced across the linear region 158.

Figure 6:
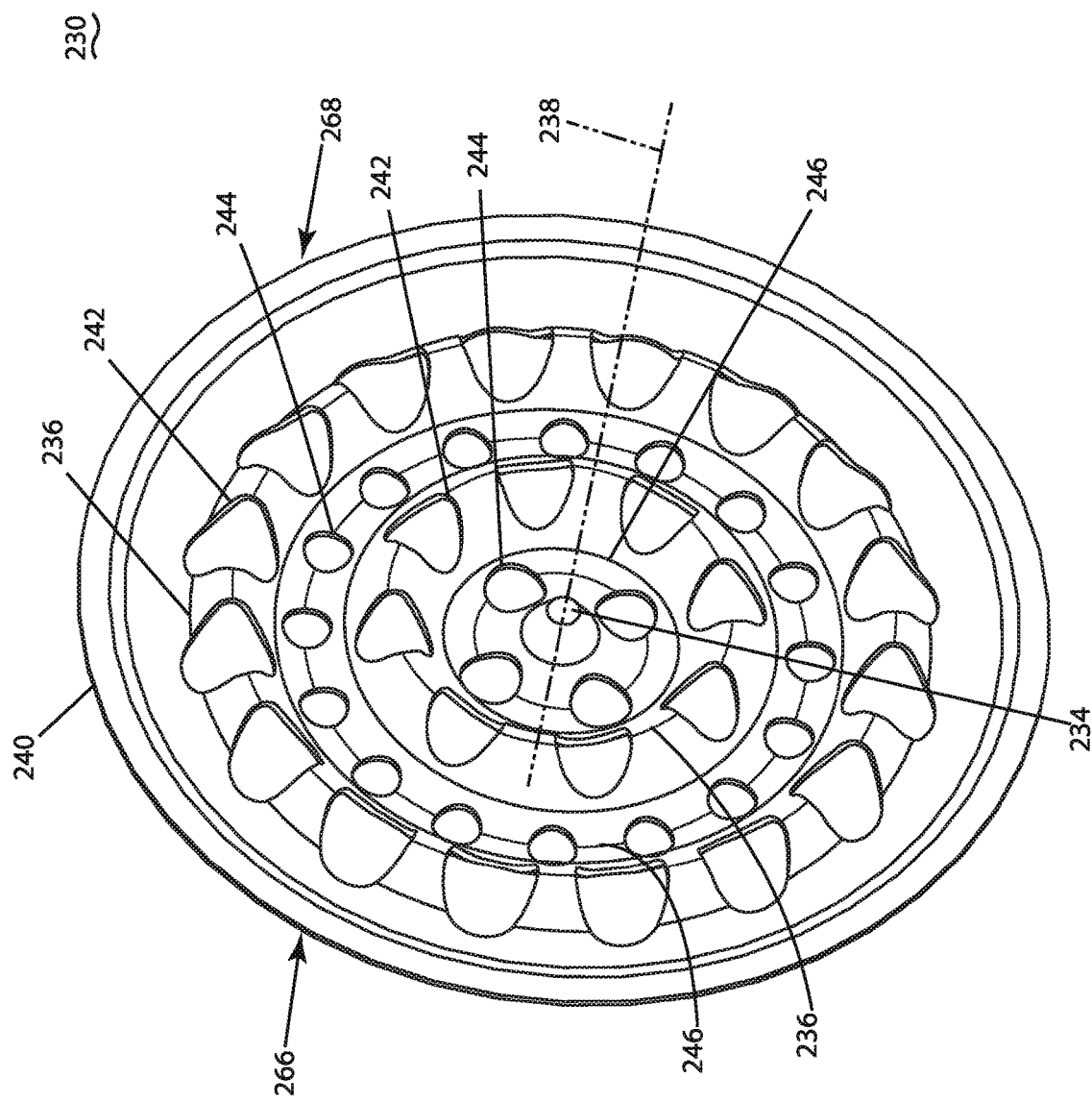
FIG. 6 is a perspective view of an exemplary flow distributor suitable for use as the flow distributor of FIG. 1, further illustrating a plate including a plurality of peaks, a set of valleys, and an exemplary set of perforations.

FIG. 6 is a perspective view of an exemplary flow distributor suitable for use as the flow distributor 18 of FIG. 1. The flow distributor can include a plate 230 that is similar to the plate 130, therefore, like parts will be identified with like numerals increased to the 200 series, with it being understood that the description of the like parts of the plate 130 applies to the plate 230 unless otherwise noted.

The plate 230, as illustrated, is removed from the inlet. The plate 230 can terminate radially along a lip 240. The plate 230 can extend between a first side 266 and an opposing second side 268. When placed in or along the inlet, the first side 266 of the plate 230 can directly confront the inlet or otherwise be directly fluidly coupled to the exhaust fluid stream when in operation. The plate 230 can extend between a first side. The plate 230 includes a plurality of peaks and a set of valleys 246 with each valley being provided between adjacent peaks. The plurality of peaks can include a first or first peak 234 and a set of peaks 236 provided radially outward from the first peak 234. The first peak 234 can define a centerline axis 238. At least one perforation can be provided along the plate 230. As a non-limiting example, the at least one perforation can be included within a first set of perforations 242 and a second set of perorations 244.

The plate 230 is similar to the plate 130 except that at least a portion of the at least one perforation of the plate 230 is provided along the apexes set of peaks 236 and the minimums of the set of valleys 246. The positioning of the perforations on the set of peaks 236 and the set of valleys 246 along the respective apexes and minimums can result in a reduction of thermal stresses when compared to the flow distributor 118 . . . .

As illustrated, the first set of perforations 242 can be defined by a first cross-sectional area while the second set of perforations 244 can be defined by a second cross-sectional area smaller than the first cross-sectional are. It is contemplated that the first set of perforations 242 are only provided along the apexes, while the second set of perforations 244 are only provided along the minimums. This placement of the first set of perforations 242 and the second set of perforations 244 can be used to control the location and amount of fluid that flow through the plate 230 during operation (e.g., more fluid can flow through the first set of perforations 242 than the second set of perforations 244 as the first set of perforations 242 are larger than the second set of perforations 244).

Figure 7:
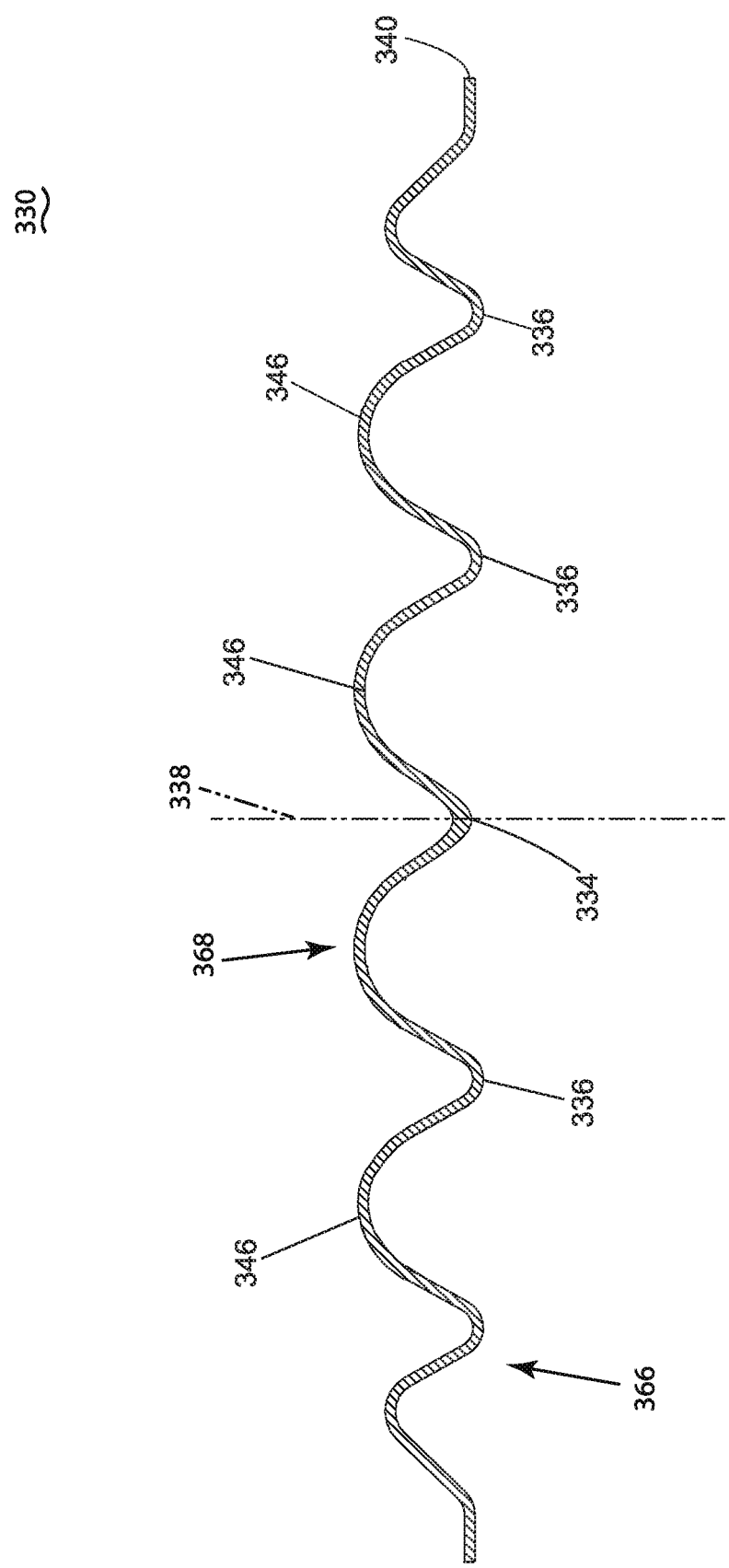
FIG. 7 is a cross-sectional side view of an exemplary flow distributor suitable for use as the flow distributor of FIG. 1, further illustrating a plate including an exemplary set of valleys and an exemplary plurality of peaks.

FIG. 7 is a cross-sectional side view of an exemplary flow distributor suitable for use as the flow distributor 18 of FIG. 1. The flow distributor can include a plate 330 that is similar to the plate 130, 230, therefore, like parts will be identified with like numerals increased to the 300 series, with it being understood that the description of the like parts of the plate 130, 230 applies to the plate 330 unless otherwise noted.

The plate 330, as illustrated, is removed from the inlet. The plate 330 can terminate radially along a lip 340. The plate 330 can extend between a first side 366 and an opposing second side 368. When placed in or along the inlet, the first side 366 of the plate 330 can directly confront the inlet or otherwise be directly fluidly coupled to the exhaust fluid stream when in operation. The plate 330 includes a plurality of peaks and a set of valleys 346 with each valley being provided between adjacent peaks. The plurality of peaks can include a first or first peak 334 and a set of peaks 336 provided radially outward from the first peak 334. The first peak 334 can define a centerline axis 338.

The plate 330 is similar to the plate 130, 230, except that the plurality of peaks extend inwardly toward the inlet, or otherwise form axially distal terminations of the first side 366, while the set of valleys 346 can extend outwardly from the inlet, or otherwise form axially distal terminations of the second side 368. In other words, the plate 330 can be inverted axially, with respect to the centerline axis 338, from the plate 130, 230. As such, the first peak 334 can form a central dimple or valley when viewed from the second side 368 of the plate.

Figure 8:
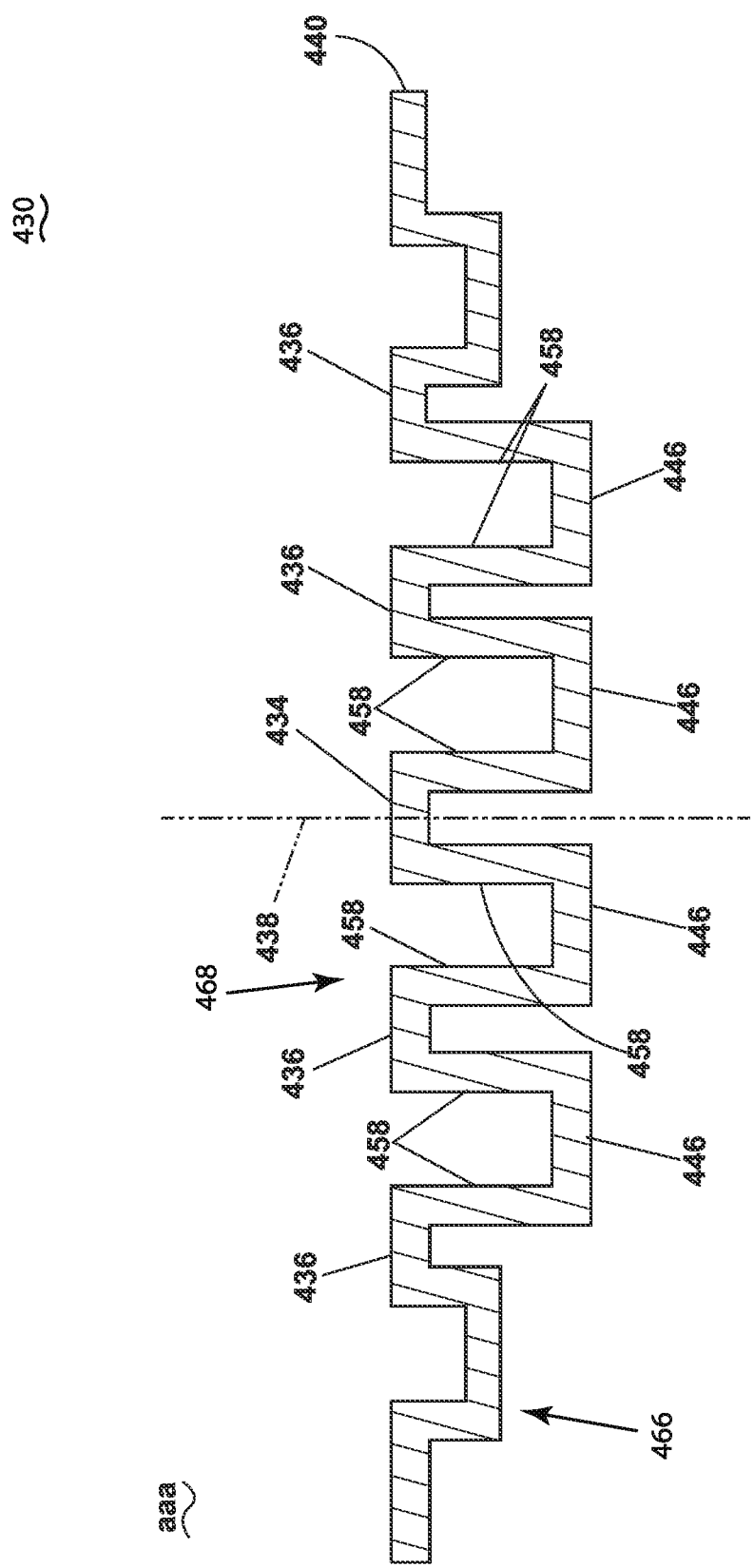
FIG. 8 is a schematic cross-sectional side view of an exemplary flow distributor suitable for use as the flow distributor of FIG. 1, further illustrating a plate including stepped formation.

FIG. 8 is a schematic cross-sectional side view of an exemplary flow distributor suitable for use as the flow distributor 18 of FIG. 1. The flow distributor can include a plate 430 that is similar to the plate 130, 230, 330, therefore, like parts will be identified with like numerals increased to the 400 series, with it being understood that the description of the like parts of the plate 130, 230, 330 applies to the plate 430 unless otherwise noted.

The plate 430, as illustrated, is removed from the inlet. The plate 430 can terminate radially along a lip 440. The plate 430 can extend between a first side 466 and an opposing second side 468. When placed in or along the inlet, the first side 466 of the plate 430 can directly confront the inlet or otherwise be directly fluidly coupled to the exhaust fluid stream when in operation. The plate 430 includes a plurality of peaks and a set of valleys 446 with each valley being provided between adjacent peaks. The plurality of peaks can include a first or first peak 434 and a set of peaks 436 provided radially outward from the first peak 434. The first peak 434 can define a centerline axis 438

The plate 430, like the plate 130, 230, 330, can include at least one linear region 458 extending between a peak and an adjacent valley. The linear region 458, however, is defined by a 0 degree angle with respect to the centerline axis 438. In other words, the linear region 458 corresponds to or is parallel to the linear region 458. Further, the apexes of each peak of the plurality of peaks and the minimum of each valley of the set of valleys 446 can extend linearly. As a non-limiting example, the apexes of each peak of the plurality of peaks and the minimum of each valley of the set of valleys 446 can extend normal to the centerline axis. As such, the plate 430 can be formed as a stepped formation.

Benefits of this disclosure include a flow distributor with a higher life expectancy when compared to a conventional flow distributor. For example, a conventional flow distributor can include a plate that is formed as a flat plate or a domed plate. As used herein, the term "domed plate" or iterations thereof can refer to a plate wherein a majority of the plate extends in one axial direction and forms a singular dome with respect to a plane normal a centerline axis of a peak of the domed plate and intersecting a radially or outer bounds of the domed plate (e.g., a lip of the plate). Some domed plates can include ribs, channels or grooves within the plate, however, these portions do not extend across the plane. During operation, the conventional flow distributor can be subjected to a thermal load that causes the conventional plate to expand, and when not in operation the plate will contract. Over time, the conventional plate will experience a thermal mechanical fatigue due to the continued or repeated expansion and contraction of the conventional plate. The thermal mechanical fatigue can ultimately result in the failure of the conventional plate or conventional flow distributor. The flow distributor as described herein, however, includes the plate including the wave formation (e.g., sinusoidal, non-sinusoidal, ripple, or stepped formations) including one or more linear regions that results in a flow distributor that is more resilient to the thermal expansion and contraction when compared to the conventional flow distributor. This wave formation along the plate allows the peaks and valleys to grow radially or axially due to thermal expansion. However, the high thermal stresses, with respect to the thermal stresses experienced along the conventional plate, are not experienced as the due to the plate, as described herein, being able to generate mechanical stresses (e.g., the stresses created by the movement of peaks, valleys, and the linear region) that offset the thermal stresses. This results in the flow distributor being able to withstand higher thermal gradients, higher thermal stresses and more thermal cycles when compared to the conventional flow distributor. This ultimately results in a longer life expectancy of the flow distributor when compared to the conventional flow distributor.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flow distributor provided within an exhaust system for a combustion engine, the combustion engine generating an exhaust fluid stream during operation of the combustion engine, the flow distributor comprising:
   an inlet configured to receive at least a portion of the exhaust fluid stream; and
   a plate having a centerline axis and being provided downstream of the inlet, the plate comprising:
      at least one perforation defining an outlet for the exhaust fluid stream;
      a first peak defining a center point of the plate and extending axially outwardly from the plate along the centerline axis;
      a second peak radially spaced from the first peak with respect to the centerline axis;
      a first valley extending radially between the first peak and the second peak; and
      a second valley formed on an opposite side of the second peak with respect to the first valley.

2. The flow distributor of claim 1, wherein at least one of the first peak or the second peak extend circumferentially about an entirety of the centerline axis.

3. The flow distributor of claim 1, wherein the first peak is defined by a first apex, the second peak is defined by a second apex, the first valley is defined by a first minimum, and the second valley is defined by a second minimum, with the first apex, the second apex, the first minimum and the second minimum defined by a maximum distance of the first peak, the second peak, the first valley, and the second valley, respectively, between the first apex, the second apex, the first minimum and the second minimum and a plane normal to the centerline axis and intersecting a point midway between the first apex and the second apex, and wherein the maximum distance is equal for the first apex, the second apex, the first minimum and the second minimum.

4. The flow distributor of claim 1, wherein the first peak and the second peak extend circumferentially about the plate to define a set of spaced circumferential peaks that are radially spaced from each other with respect to the centerline axis.

5. The flow distributor of claim 1, wherein the first peak and the second peak form concentric circles on the plate, with the first valley extending therebetween.

6. The flow distributor of claim 1, wherein the plate further comprises a first linear region defining a transition between the first peak and the first valley or the second peak and the first valley, and wherein the first linear region extends linearly with respect to the centerline axis, and wherein the first peak, the second peak, and the first valley are defined by a first radius of a curvature, a second radius of curvature and a third radius of curvature, respectively.

7. The flow distributor of claim 6, wherein the first linear region extends at an angle with respect to the centerline axis, the angle being between 0 degrees and 45 degrees.

8. The flow distributor of claim 6, wherein the plate further comprises a second linear region extending between the second peak and the second valley, and wherein the first linear region extends at a first angle and the second linear region extends at a second angle, non-equal to the first angle, with respect to the centerline axis.

9. The flow distributor of claim 6, wherein the plate is defined by a plate thickness, and wherein a total length of the first linear region is greater than four times the plate thickness.

10. The flow distributor of claim 6, wherein the first linear region extends between the first peak and the first valley, and wherein the at least one perforation terminates at one of either:
   a distance greater than or equal to one times the first radius of curvature from a point on the linear region nearest the first peak; or
   a distance greater than or equal to one-fourth times the third radius of curvature from a point on the linear region nearest the first valley.

11. The flow distributor of claim 1, wherein the at least one perforation is included within a first plurality of perforations and a second plurality of perforations, and wherein:
   each first perforation of the first plurality of perforations includes a first cross-sectional area when viewed along a plane intersecting and extending along a respective first perforation; and
   each second perforation of the second plurality of perforations includes a second cross-sectional area, smaller than the first cross-sectional area, when viewed in a plane intersecting and extending along a respective second perforation.

12. The flow distributor of claim 11, wherein the first plurality of perforations include at least two radially spaced rows of circumferentially spaced first perforations, and the second plurality of perforations include at least two radially spaced rows of circumferentially spaced second perforations, and wherein each radially spaced row of first perforations is adjacent at least one radially spaced row of second perforations.

13. The flow distributor of claim 11, wherein the first plurality of perforations and the second plurality of perforations one of either do not intersect a first apex of the first peak, a second apex of the second peak, or a minimum of the first valley, or at least one radially spaced row of first perforations of the first plurality of perforations intersect a respective apex of one of either the first peak or the second peak, and at least one radial row of second perforations of the second plurality of perforations intersect a minimum of the first valley.

14. The flow distributor of claim 11, wherein the first cross-sectional area and the second cross sectional area are formed as circles, ovals, or polygons.

15. The flow distributor of claim 1, wherein the plate is defined by a wave formation having a sinusoidal formation, non-sinusoidal formation, ripple formation, or stepped formation.

16. A flow distributor provided within an exhaust system for a combustion engine, the combustion engine generating an exhaust fluid stream during operation of the combustion engine, the flow distributor comprising:

an inlet configured to receive at least a portion of the exhaust fluid stream; and a plate defining a centerline axis and being provided downstream of the inlet, the plate comprising:

at least one perforation defining an outlet for the exhaust fluid stream;

a first peak defined by a first radius of curvature;

a second peak radially spaced from the first peak with respect to the centerline axis and defined by a second radius of curvature;

a first valley extending radially between the first peak and the second peak and defined by a third radius of curvature; and at least one linear region extending linearly between the first peak and the first valley;

wherein the at least one perforation terminates at one of either a distance greater than or equal to one of the first radius of curvature from a point on the at least one linear region nearest the first peak, or at a distance greater than or equal to one-fourth times the third radius of curvature from a point on the at least one linear region nearest the first valley.

17. A flow distributor provided within an exhaust system for a combustion engine, the combustion engine generating an exhaust fluid stream during operation of the combustion engine, the flow distributor comprising:

an inlet configured to receive at least a portion of the exhaust fluid stream; and a plate having a centerline axis and being provided downstream of the inlet, the plate comprising:

at least one perforation defining an outlet for the exhaust fluid stream;

a first peak;

a second peak radially spaced from the first peak with respect to the centerline axis;

a first valley extending radially between the first peak and the second peak; and a second valley formed on an opposite side of the second peak with respect to the first valley;

wherein the first peak is defined by a first apex, the second peak is defined by a second apex, the first valley is defined by a first minimum, and the second valley is defined by a second minimum, with the first apex, the second apex, the first minimum and the second minimum defined by a maximum distance of the first peak, the second peak, the first valley, and the second valley, respectively, between the first apex, the second apex, the first minimum and the second minimum and a plane normal to the centerline axis and intersecting a point midway between the first apex and the second apex, and wherein the maximum distance is equal for the first apex, the second apex, the first minimum and the second minimum.

18. The flow distributor of claim 17, wherein at least one of the first peak or the second peak extend circumferentially about an entirety of the centerline axis.

19. The flow distributor of claim 17, wherein the first peak and the second peak extend circumferentially about the plate to define a set of spaced circumferential peaks that are radially spaced from each other with respect to the centerline axis.

20. The flow distributor of claim 17, wherein the first peak defines a center point of the plate and extends axially outwardly from the plate along the centerline axis.

* * * * *